United States Patent [19]
Kang

[11] Patent Number: 5,722,914
[45] Date of Patent: Mar. 3, 1998

[54] SYSTEM AND METHOD FOR INCREASING ENGINE IDLE DURING OPERATION OF AN ANTI-LOCK BRAKE SYSTEM

[75] Inventor: Chang Woo Kang, Kyungsangnam-do, Rep. of Korea

[73] Assignee: Hyundai Motor Company, Rep. of Korea

[21] Appl. No.: 684,047

[22] Filed: Jul. 22, 1996

[30] Foreign Application Priority Data

Jul. 21, 1995 [KR] Rep. of Korea .................. 95-21585

[51] Int. Cl.[6] .............................. H02P 5/04; B60K 41/20
[52] U.S. Cl. ........................................ 477/187; 477/203
[58] Field of Search ................................. 477/183, 187, 477/203

[56] References Cited

FOREIGN PATENT DOCUMENTS 4-301154   10/1992   Japan .

*Primary Examiner*—Dirk Wright
*Attorney, Agent, or Firm*—Finnegan, Henderson, Farabow, Garrett & Dunner, L.L.P.

[57] ABSTRACT

A system and method for increasing engine idle during operation of an anti-lock brake system includes car-speed sensing means, in which the state of an electronic signal, outputted according to a driving speed of an automobile, is changed; engine revolution sensing section means, which varies the state of an electronic signal outputted according to the engine's revolutions; operation control means, which, when the ABS operation is realized, outputs a control signal for increasing the revolutions of the engine so that it matches the speed the automobile is travelling; a solenoid valve, which controls the state of pressure applied to change the operational degree of the acceleration pedal; switching means, which, according to the state of the signal applied from the operation control means, controls the operational state of the solenoid valve; a vacuum pump, which is linked with the operation of the alternator and creates pressure, and, according to an opening state of the solenoid valve, supplies pressure; and an actuator, which, according to the operation of the switching means, varies the operating state of the acceleration pedal if pressure is created in the vacuum pump and passed through the solenoid valve.

4 Claims, 2 Drawing Sheets

5,722,914

SYSTEM AND METHOD FOR INCREASING ENGINE IDLE DURING OPERATION OF AN ANTI-LOCK BRAKE SYSTEM

BACKGROUND

The present invention relates to an idle-increasing control of an engine, and more particularly, to a system and method for increasing engine idle during operation of an anti-lock brake system (ABS), which quickly returns an engine to a fixed level of engine revolutions so that an automobile can be safely steered.

Generally, ABSs are electronic control systems which, when emergency braking or braking on slippery road surfaces (caused by snow, rain, etc.), sense if any of the vehicle's wheels are skidding, and by controlling brake pressure to an appropriate level, improve steering safety and overall control.

As a result, because brake pressure of each wheel is varied according to road conditions, the wheels are controlled so as to not skid, and even when emergency braking, brake pressure is controlled to an appropriate level immediately before the wheels start to skid, thus, preventing the wheels from locking up.

Accordingly, precautions are taken against severe accidents where an automobile skids and even flips over, and also against collision accidents.

In addition, ABSs, which prevent the locking up of wheels caused by braking, apply brake pressure first to the front wheels of cars.

Therefore, ABSs allow for the prevention of flipping or going off the road caused when brake pressure is applied to the rear wheels first when braking at high speeds.

However, ABS devices like the above installed for improving the safety of automobiles, as they change the operating state of a braking system installed to the front and rear wheels of an automobile a multiple number of times in an extremely short period of time, there is a delay in the engine revolutions being returned to a level appropriate for the speed in which the automobile is travelling.

As a result, there is a drawback when travelling on windy roads or when needing to avert an obstacle, etc.. Because the engine does not speedily return to a state where its revolutions match the speed of the car, safe steering is not possible.

SUMMARY

The present invention has been made in an effort to solve the above problems.

It is an object of the present invention to provide a system and method for increasing engine idle during operation of an anti-lock brake system that automatically increases an engine's revolutions so that safe driving operations can be executed.

To achieve the above object and according to one aspect of the present invention, a system for increasing engine idle during operation of an ABS comprises:

car-speed sensing means, in which the state of an electronic signal, outputted according to a driving speed of an automobile, is changed;

engine revolution sensing section means, which varies the state of an electronic signal outputted according to the engine's revolutions;

operation control means, which, when the ABS operation is realized, outputs a control signal for increasing the revolutions of the engine so that it matches the speed the automobile is travelling;

a solenoid valve, which controls the state of pressure applied to change the operational degree of the acceleration pedal;

switching means, which, according the state of the signal applied from the operation control means, controls the operational state of the solenoid valve;

a vacuum pump, which is linked with the operation of the alternator and creates pressure, and, according to an opening state of the solenoid valve, supplies pressure; and an actuator, which, according to the operation of the switching means, varies the operating state of the acceleration pedal if pressure is created in the vacuum pump and passed through the solenoid valve.

Also to achieve the above object and according to another aspect of the present invention, a method for increasing engine idle during operation of the ABS comprises the steps of:

comparing and determining a car speed and fixed speed, calculated according to the signal inputted from the car-speed sensing section when the drive signal of the relay is outputted so as to execute control of the ABS;

outputting a drive signal for driving the switching means when it is determined that the car speed is more than the fixed speed;

comparing and determining a fixed value with revolutions of the engine which is calculated according to the inputted signal from the engine revolution sensing means; and suspending output of the driving signal to drive the switching means if the engine's revolutions are more than a fixed value.

BRIEF DESCRIPTION OF THE DRAWINGS

Further objects and other advantages of the present invention will become apparent from the following description in conjunction with the attached drawings, in which.

DESCRIPTION

Reference will now be made in detail to the present preferred embodiment of the invention, an example of which is illustrated in the accompanying drawings. Wherever possible, the same reference numbers will be used throughout the drawings to refer to the same or like parts.

Figure 1:
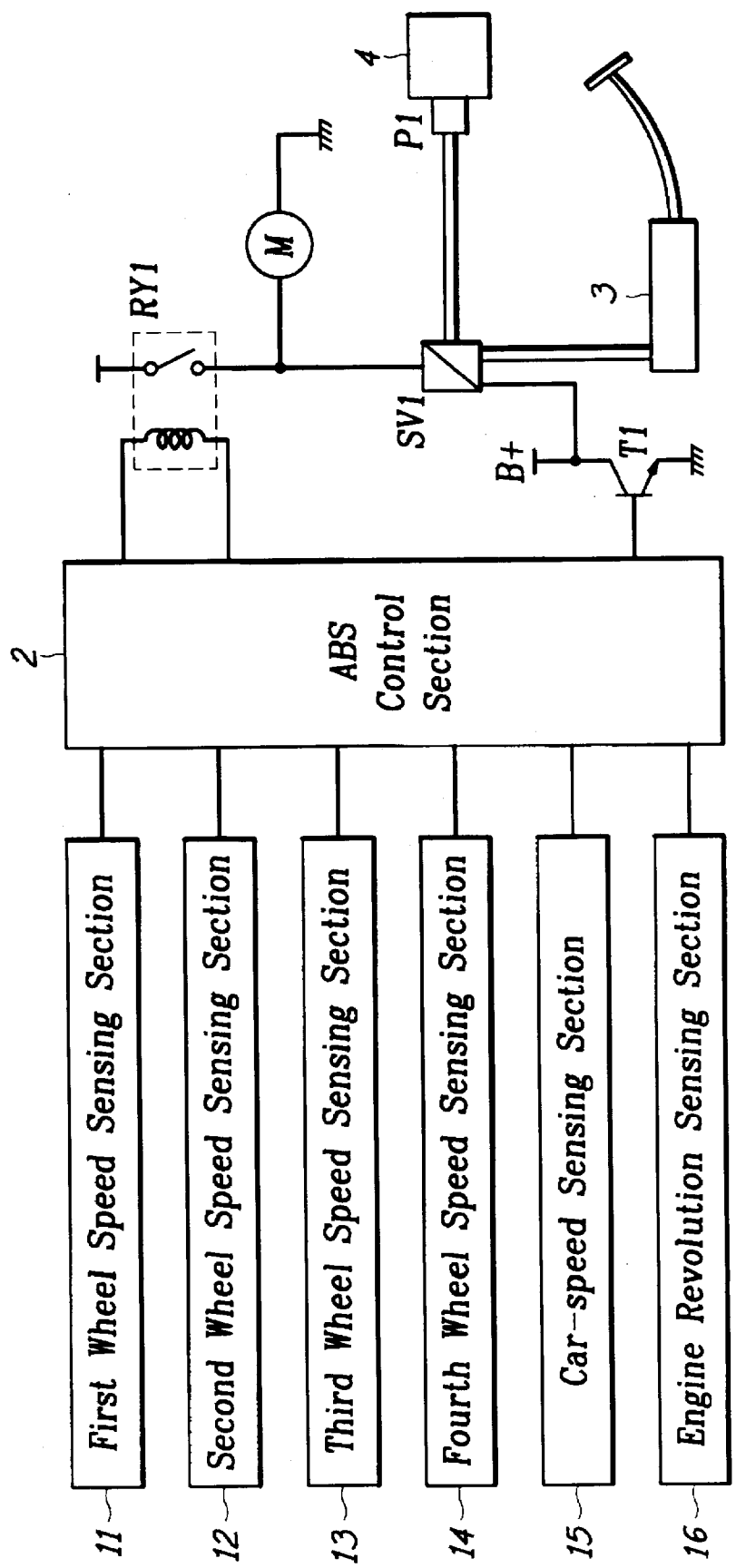
FIG. 1 is a block diagram of a system for increasing engine idle during operation of an anti-lock brake system according to a preferred embodiment of the present invention.

FIG. 1 is a block diagram of a system for increasing engine idle during operation of an anti-lock brake system according to a preferred embodiment of the present invention.

Figure 2:
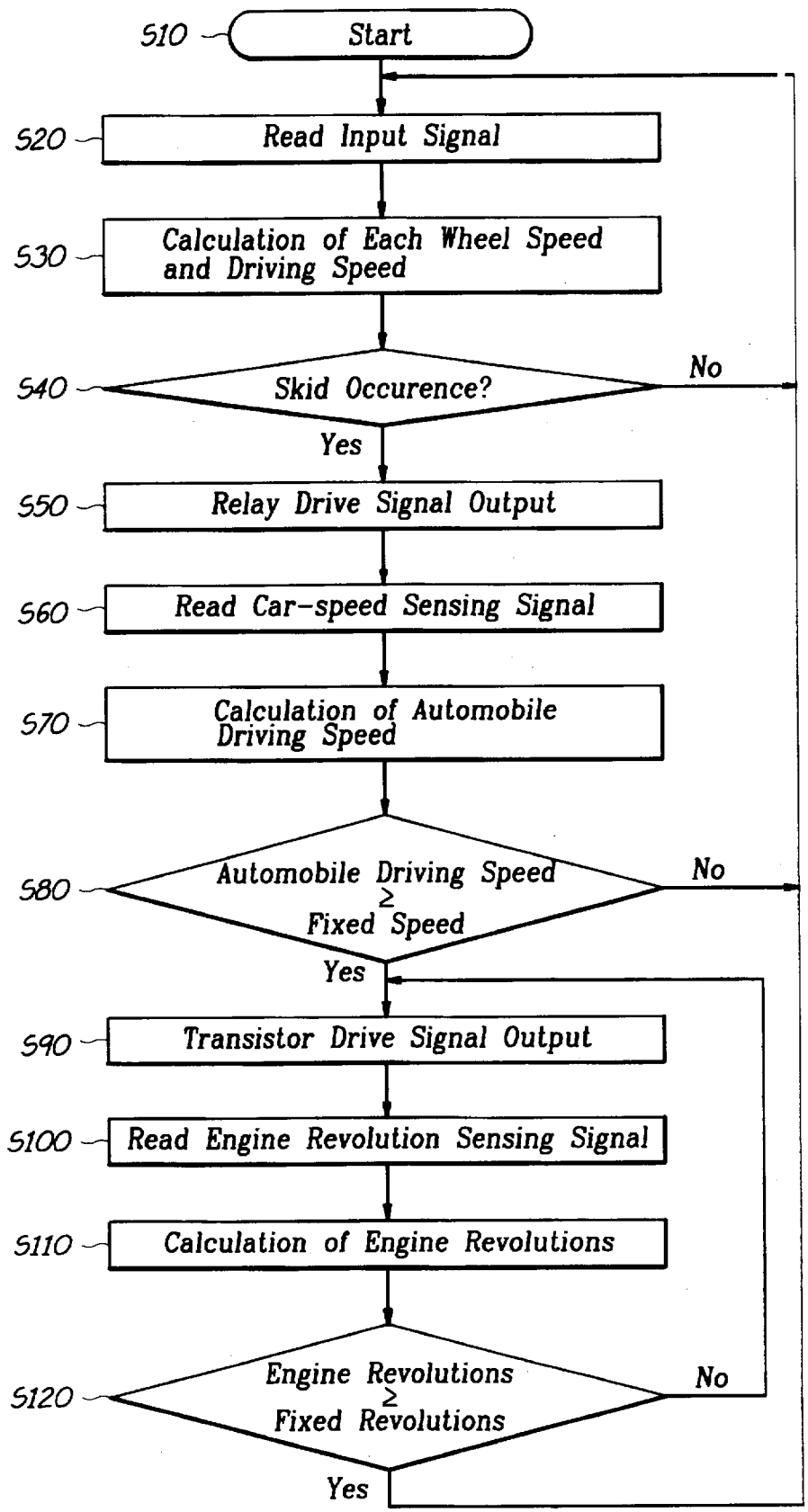
FIG. 2 is a flow chart of a method for increasing engine idle during operation of an anti-lock brake system according to a preferred embodiment of the present invention.

FIG. 2 is a flow chart of a method for increasing engine idle during operation of an anti-lock brake system according to a preferred embodiment of the present invention.

With reference to FIG. 1, the structure of the present invention comprises first-fourth wheel speed sensing sections 11–14, which change the state of an electronic signal which is outputted according to the rotational speed of the front and rear wheels of an automobile; a car-speed sensing section 15, which changes the state of an electronic signal which is outputted according to the driving speed of an automobile; an engine revolution sensing section 16, which changes the state of an electronic signal which is outputted according to the number of revolutions of an engine; an ABS control section 2, connected to the sensing sections 11–16, controls the operation of the ABS, and outputs a control signal for controlling the driving speed of an automobile when the ABS operates; a relay (RY1), the operational state of which is changed according to the control operation of the ABS control section 2; a motor (M), which, according to the operation of the relay (RY1) creates oil pressure needed for the ABS control operation; a solenoid valve (SV1) which is connected to the relay (RY1); a transistor (T1), having a collector terminal connected to an electrical source (B+) and to the relay (RY1), a base terminal connected to the ABS control section 2, and its emitter terminal is grounded; an acceleration pedal actuator 3, which is connected to the solenoid valve (SV1) and controls the operational state of the acceleration pedal according to pressure applied through the solenoid valve (SV1); and a vacuum pump (P1), which is connected to an alternator 4 of an automobile and creates pressure needed for the operation of the acceleration pedal actuator 3.

The following is the operation of the present invention with the above structure.

First, if electricity required for operation is supplied, each device is changed to a state where operation is possible, and the ABS control section 2 also starts its operation (S10).

The ABS control section 2 senses skidding of the automobile, and in order to control ABS operation, reads inputted signals from the first-fourth wheel speed sensing sections 11–14, installed at each wheel, and from the car-speed sensing section 15 (S20). From this information, the ABS control section 2, calculates the speed of the wheels and of the automobile (S30).

Then, the ABS control section 2, according to the calculated wheel speed and driving speed, uses an already established mathematical formula and determines whether skidding is occurring (S40).

If wheel and car speed does not exactly correspond with each other, it is determined that the automobile is skidding. When this happens, the ABS control section 2 outputs a driving signal to the relay (RY1) so that operation of the ABS can be executed (S50).

The motor (M) operates according to the operation of the relay (RY1) and oil pressure required for the operation of the ABS is created.

Next, according to the operation of the ABS control section 2, each corresponding solenoid valve operation and each wheel cylinder is controlled (not shown).

As a result, when the wheels start skidding, the operation of the brake devices that are installed at each wheel are controlled and safe operation of the vehicle is possible.

Through the above operations, if the driving signal of the relay, for the execution of the ABS, is outputted, the ABS control section 2 reads the inputted signal from the car-speed sensing section 15 (S60), and car speed during operation of the ABS is calculated (S70).

After the above, the calculated car speed and a fixed car speed is compared, and it is determined whether the calculated car speed is over the fixed car speed (S80).

If it is (over the fixed car speed), the ABS control section 2 outputs a drive signal to the transistor (T1) to open the solenoid valve (SV1).

As a result, the transistor is changed to an on state and the solenoid valve (SV1) is in an open state.

At this time, because the vacuum pump (P1) is connected to the alternator 4, as the vacuum pump (P1) is always in an operating state, pressure created from the operation of the pump (P1) passes through the solenoid valve (SV1), which is in an off state, and is supplied to the acceleration pedal actuator 3, operating the acceleration lever.

The opening state of a throttle valve (not shown) is changed by the operation of the acceleration pedal actuator 3, and the state of the engine is changed to where its revolutions are increased.

When the ABS is controlled like in the above, after the engine revolution is increased, so that the state of the engine is quickly returned to an appropriate state when the actual driving speed is over a fixed speed, the ABS control section 2 reads the inputted signal from the engine revolution sensing section 16 (S100), and calculates the revolutions of the engine (S110).

The ABS control section 2 then compares and determines the revolutions of the engine to see if it meets fixed conditions (S120).

If the engine's revolutions increase to a level satisfying the fixed conditions, the ABS control section 2 discontinues the transistor (T1) drive signal, and if the fixed conditions are not met, the above steps from (S90) to (120) are repeated so that control operations are appropriately realized.

When ABS is controlled, because engine revolutions are increased according to the driving speed of the automobile, the engine revolutions can not maintain a stagnant state, and the problem of required time needed for the engine to return to an appropriate state is solved.

Also, by the above idle-increasing operation, because the speed of the wheels' revolutions match that of the cat's driving speed, steering can be safely realized.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A system for increasing an engine idle during operation of an automobile anti-lock brake system comprising:

car-speed sensing means for changing a state of an electronic signal, outputted according to a driving speed of the automobile;

engine revolution sensing section means for varying a state of an electronic signal outputted according to the engine's revolutions;

operation control means for outputting, when an ABS operation is realized, a control signal for increasing the revolutions of the engine so that it matches the speed the automobile is travelling;

a solenoid valve which controls a state of pressure applied to change an operational degree of an acceleration pedal;

switching means for controlling, according to a state of the signal applied from the operation control means, an operational state of the solenoid valve;

a vacuum pump, which is linked with the operation of an alternator and creates pressure, and, according to an opening state of the solenoid valve, supplies pressure; and an actuator, which, according to the operation of the switching means, varies an operating state of the acceleration pedal if pressure is created in the vacuum pump and passed through the solenoid valve.

2. The system for increasing engine idle during operation of an ABS according to claim 1, wherein the solenoid valve, in order to drive a motor which creates pressure needed for the operation of the ABS, is connected to a relay, which varies its operational state according to the control operation of the operation control means.

3. The system for increasing engine idle during operation of an ABS according to claim 1, wherein the switching means, which is realized through a transistor that controls the operational state of the solenoid valve, is turned on/off according to an output signal of the operation control means applied through a base terminal when the ABS is being controlled.

4. A method for increasing an engine idle during operation of an automobile ABS comprising the steps of:

comparing and determining the automobile speed and a fixed speed, calculated according to a signal inputted from an automobile speed sensing section when a drive signal of a relay is outputted so as to execute control of the ABS;

outputting a drive signal for driving a switching means when it is determined that the automobile speed is more than the fixed speed;

comparing and determining a fixed value with revolutions of the engine which is calculated according to an inputted signal from an engine revolution sensing means; and suspending output of the driving signal to drive the switching means if the engine's revolutions are more than a fixed value.

* * * * *